(12) United States Patent
Namiki

(10) Patent No.: US 7,503,570 B2
(45) Date of Patent: Mar. 17, 2009

(54) HANDCART

(76) Inventor: Tosiki Namiki, 120-1 Nozawa, Saku-shi, Nagano (JP) 385-0053

( * ) Notice: Subject to any disclaimer, the term of this patent is extended or adjusted under 35 U.S.C. 154(b) by 128 days.

(21) Appl. No.: 11/230,480

(22) Filed: Sep. 21, 2005

(65) Prior Publication Data

US 2007/0024014 A1 Feb. 1, 2007

(30) Foreign Application Priority Data

Jul. 28, 2005 (JP) ............................. 2005-218903

(51) Int. Cl.
*B62B 3/00* (2006.01)
*B62B 5/06* (2006.01)
(52) U.S. Cl. .................. 280/47.34; 280/79.11
(58) Field of Classification Search ............. 280/47.34, 280/47.35, 33.991, 33.992, 87.021, 79.11, 280/79.2, 79.3; 16/421, 430; 74/523, 551.9
See application file for complete search history.

(56) References Cited

U.S. PATENT DOCUMENTS

| | | | | |
|---|---|---|---|---|
| 1,144,957 A | * | 6/1915 | Andree | 280/47.34 |
| 1,533,837 A | * | 4/1925 | Douglas | 280/87.041 |
| 3,995,650 A | * | 12/1976 | DiVito | 135/72 |
| 4,799,668 A | * | 1/1989 | Jansen | 482/57 |
| 5,199,728 A | * | 4/1993 | Hutchison | 280/33.992 |
| 5,244,225 A | * | 9/1993 | Frycek | 280/304.1 |
| 5,915,712 A | * | 6/1999 | Stephenson et al. | 280/304.1 |
| 6,434,793 B1 | * | 8/2002 | Ensson | 16/421 |
| 6,651,993 B1 | * | 11/2003 | Emerzian et al. | 280/47.34 |
| 6,767,019 B2 | * | 7/2004 | van Hekken | 280/47.35 |
| 6,898,824 B2 | * | 5/2005 | Zaltron | 16/430 |
| 7,011,335 B2 | * | 3/2006 | Kight | 280/655.1 |
| 7,017,936 B2 | * | 3/2006 | Huang | 280/642 |

* cited by examiner

*Primary Examiner*—Frank B Vanaman
(74) *Attorney, Agent, or Firm*—Bacon & Thomas, PLLC

(57) ABSTRACT

A handcart includes a main body section, a pair of wheels provided to the main body section, and operation sections provided at the rear in the traveling direction of the main body section. A holding section is rotatably fitted to a vertical portion of an arm section of each of the operation sections. A user can change the direction of the handcart by making a pushing-forward motion or a pulling-back motion while holding the holding sections. This saves the user from having to move his or her body when making a direction change, thereby allowing the user to easily change the direction of the handcart in a narrow space as well as reducing labor necessary for making the direction change.

6 Claims, 6 Drawing Sheets

HANDCART

BACKGROUND OF THE INVENTION

1. Field of the Invention

The present invention relates to a handcart, and more specifically, to a handcart allowing a user to easily change of its direction.

2. Description of the Related Art

As handcarts, a variety of types have been hitherto known, such as a shopping cart, a carriage, a cultivator used for agricultural work, a lawn mower, and so forth.

An example of such conventional handcarts is disclosed in Japanese Unexamined Patent Application Publication No. 11-139315. As shown in FIG. 8, this handcart 30 includes a luggage carrier 31, wheels 32 provided to the luggage carrier 31, and operation sections 33 on the right and left sides at the rear of the luggage carrier 31. The handcart 30 is configured so that its movement in the traveling direction or its change in direction can be performed by a user applying a force to the handcart while holding the operation sections 33.

Such a conventional handcart 30 is adapted to have its direction changed by a degree of $\theta_1$ from a line I-I to a line II-II, by the user applying a force to the handcart while holding the operation sections 33. That is, the user moves his or her body by the degree of $\theta_1$ from the line I-I to the line II-II, and thereby, for example, relative to the left-side wheel 32, both wheels 32 are moved from the positions on a line $A_1$-$A_1$ to the positions on a line $B_1$-$B_1$.

In this manner, the conventional handcart needs labor for moving the user's body when he or she attempts to change the direction of the handcart. In addition, the conventional handcart requires a space for moving the user's body. This has undesirably made it difficult to change the direction of the handcart, e.g., on a narrow passage or at a place with an obstruction such as a wall.

SUMMARY OF THE INVENTION

Accordingly, the present invention is directed to solve the above-described conventional problems. Specifically, the present invention is directed to a handcart eliminating the user having to move his or her body when attempting to change the direction of the handcart, and allowing the user to easily change its direction in a narrow space as well as saving labor when making the direction change.

To solve the above-described problems, the present invention, in an aspect, provides a handcart movable by pushing in the traveling direction thereof, the handcart including a main body section; at least a pair of wheels provided to the main body section; and operation sections provided at the rear in the traveling direction of the main body section. Herein, the operation sections are installed on the right and left sides of the main body section, and each of the operation sections has an arm section having a vertical portion.

In the above-described handcart according to the present invention, the main body section preferably has a box-shaped luggage carrier with the top surface thereof being open.

In the above-described handcart according to the present invention, the main body section may have a cage with the top surface thereof being open.

Also, in the above-described handcart according to the present invention, the operation section is preferably configured so that a holding section is fitted onto the outside of the vertical portion of the arm section thereof so as to be rotatable relative to the vertical portion.

In another aspect, the present invention provides a handcart movable by pushing in the traveling direction thereof, the handcart including a box-shaped main body section with the top surface thereof being open; a pair of wheels provided on the right and left sides of the main body section; and operation sections provided at the rear in the traveling direction of the main body. Herein, the operation sections are installed on the right and left sides of the main body section; each of the operation sections has an arm section having a vertical portion; and a holding section is fitted onto the outside of the vertical portion of the arm section thereof so as to be rotatable relative to the vertical portion.

In still another aspect, the present invention provides a handcart movable by pushing in the traveling direction thereof, the handcart including a cage-shaped main body section with the top surface thereof being open; a pair of wheels provided on the right and left sides at each of the front and rear of the main body section; and operation sections provided at the rear in the traveling direction of the main body. Herein, the operation sections are installed on the right and left sides of the main body section; each of the operation sections has an arm section having a vertical portion; and a holding section is fitted onto the outside of the vertical portion of the arm section thereof so as to be rotatable relative to the vertical portion.

In the above-described handcart according to the present invention, the wheels are preferably configured so that a pair of wheels provided at least at the front of the main body section, out of the front and rear thereof, are rotatable in the horizontal direction.

As described above, the handcart according to the present invention includes a main body section; at least a pair of wheels provided to the main body section; and operation sections provided at the rear in the traveling direction of the main body section. Here, the operation sections are installed on the right and left sides of the main body section, and each of the operation sections has an arm section having a vertical portion. These features save the user from having to move his or her body when changing the direction of the handcart, thereby allowing the user to easily change the direction of the handcart in a narrow space. Also, when each of the operation sections is configured so that a holding section is fitted to the vertical portion of the arm section thereof so as to be rotatable relative to the vertical portion, it is possible to even more reduce labor when making a direction change.

DESCRIPTION OF THE PREFERRED EMBODIMENTS

Hereinafter, embodiments of the present invention will be described with reference to the accompanying drawings.

Figure 1:
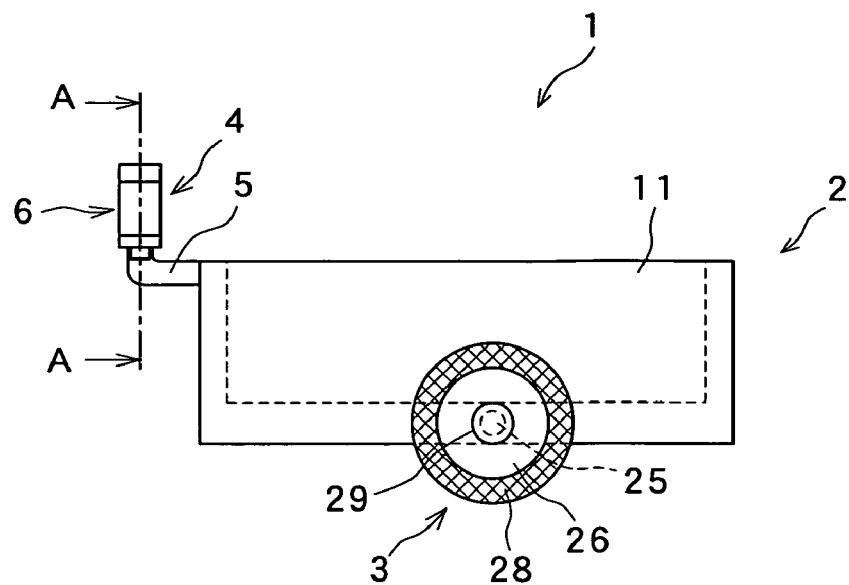
FIG. 1 is a schematic side elevation of a handcart according to a first embodiment of the present invention.
Figure 2:
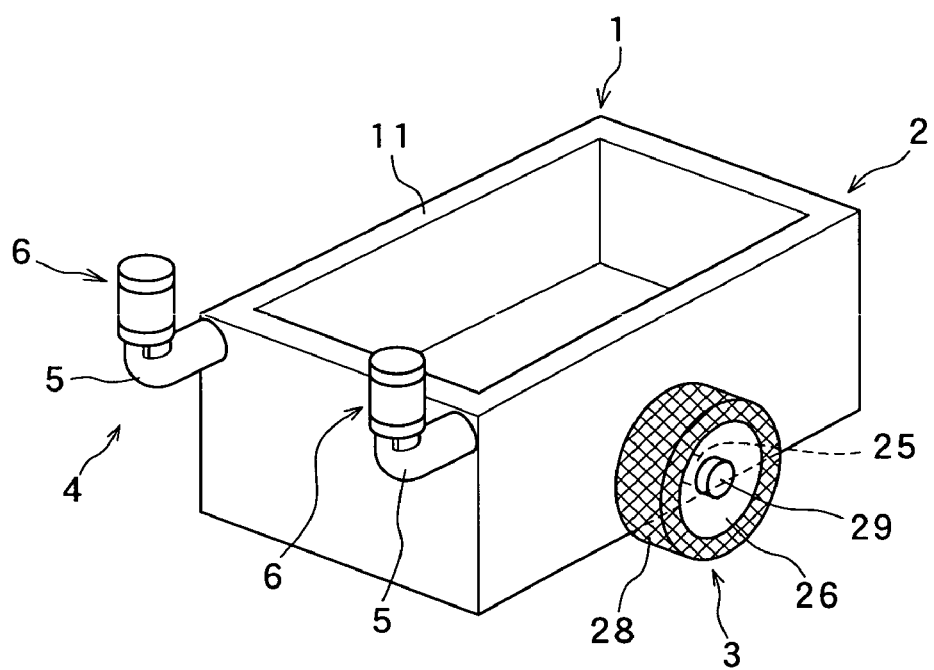
FIG. 2 is a schematic perspective view showing the overall construction of the handcart in FIG. 1.
Figure 3:
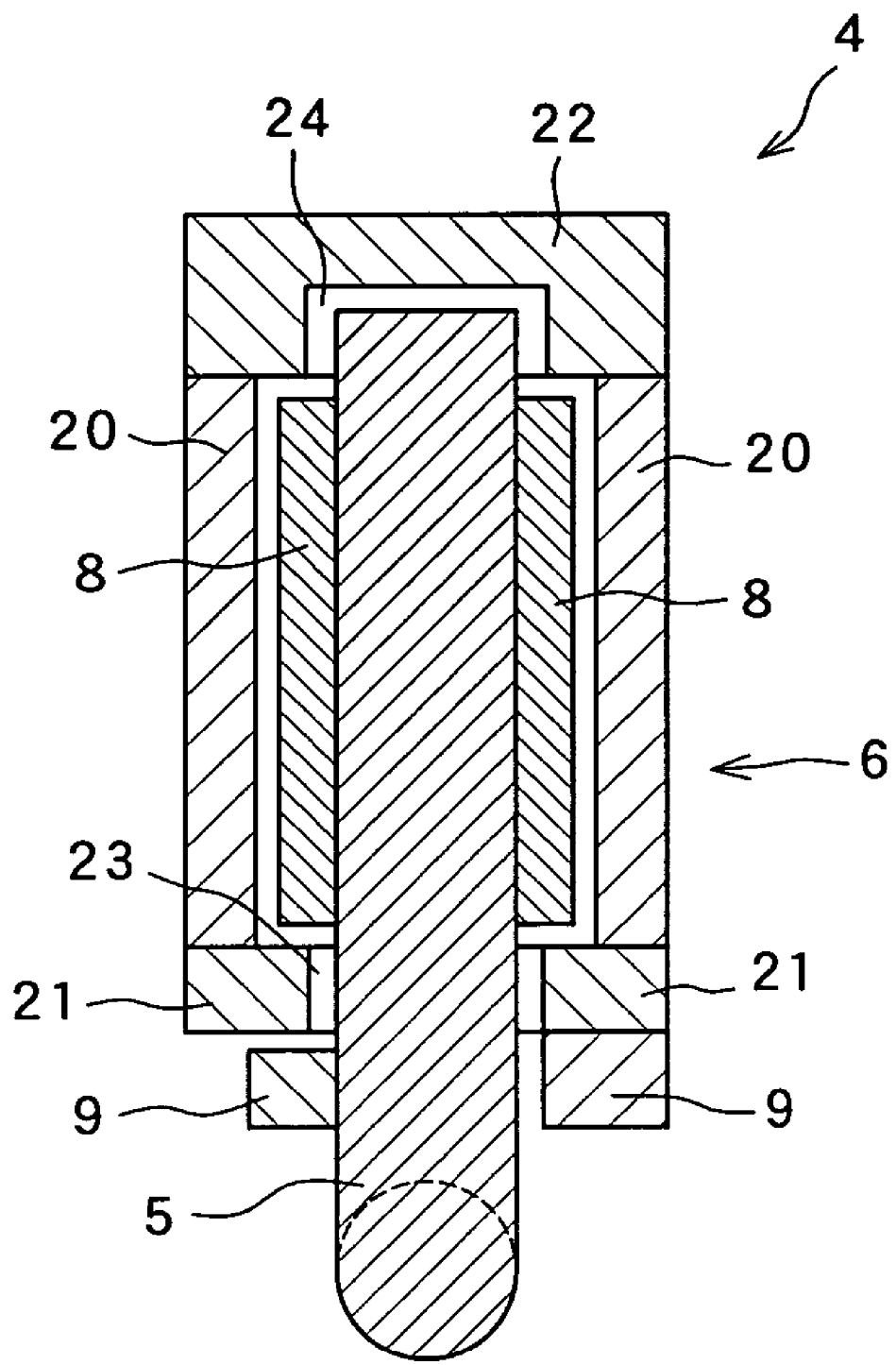
FIG. 3 is a schematic sectional view taken along a line A-A in each of FIG. 1 and FIG. 5.
Figure 4:
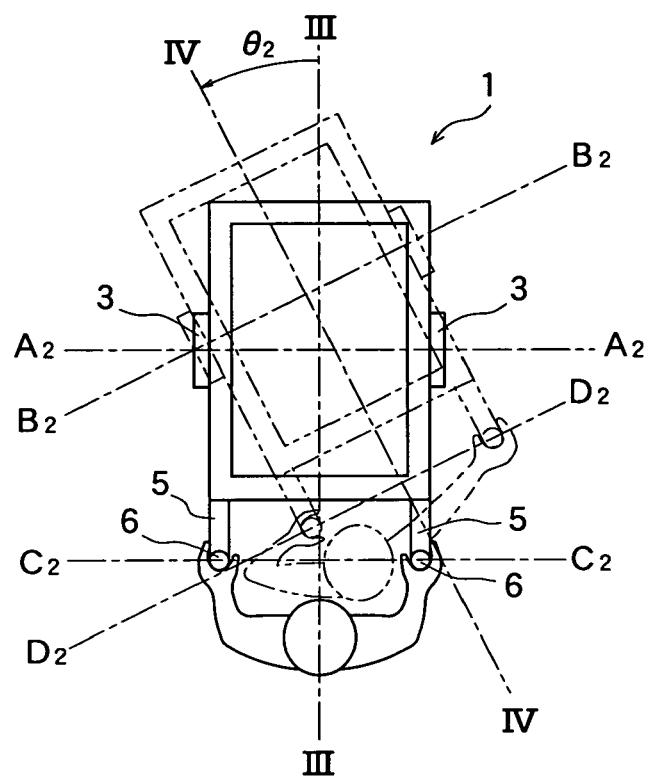
FIG. 4 is a schematic plan view showing a movement of the handcart when subjected to a direction change.

FIGS. 1 to 4 are representations of a handcart according to a first embodiment of the present invention. Specifically, FIG. 1 is a schematic side elevation thereof; FIG. 2 is a schematic perspective view thereof; FIG. 3 is a schematic sectional view taken along a line A-A in FIG. 1; and FIG. 4 is a schematic plan view showing how the handcart 1 moves when subjected to a direction change.

As shown in FIGS. 1 and 2, the handcart 1 includes a main body section 2; a pair of tire/wheel assemblies 3 provided to opposite sides of the main body section; and operation sections 4 provided at the rear in the traveling direction of the main body section 2, and used for performing an operation for a movement in the traveling direction or an operation for changing the direction of the the handcart 1.

The main body section 2 is a box-shaped luggage carrier 11 with only its upper portion being open, and configured so as to carry therein luggage or the like.

On the opposite sides of the main body section 2, there are provided tire/wheel assemblies 3.

Each of the tire/wheel assemblies 3 includes, for example, a disk-shaped wheel 26 in which a bearing (not shown) is provided at the center thereof, and an annular tire 28 provided so as to cover the peripheral surface of the wheel 26. The tire/wheel assemblies 3 are installed so as to be rotatably relative to the axle 25 by inserting the axle 25 protruding from opposite sides of the main body section 2, through the bearings of the tire/wheel assemblies 3.

Here, each of the protruding ends of the axle 25 has a dropout prevention member 29 for preventing the dropout of the tire/wheel assembly 3.

Each of the operation sections 4 is formed, for example, into an upward L-shape by bending a pipe upward, and includes a pair of arm sections 5 protruded from the right and left sides at the rear the main body section 2, toward the rear side of the main body section 2; and holding sections 6 each provided to the vertical portion of the arm section 5.

Each of the operation sections 4 is formed of an L-shaped member comprising the arm section 5 and the holding section 6.

As shown in FIG. 3, in the vertical portion of the arm section 5, a cylinder 8 is fitted onto a portion located to a certain extent inside the front end of the vertical portion, thereby forming an integrated larger-diameter section. Also, a lower lid 21 is provided under the cylinder 8.

The holding section 6 rotatably covers the vertical portion of the arm section 5, and includes a cylinder 20, the lower lid 21, and an upper lid 22. At the center of the upper lid 22, there is provided an insertion hole 24 for accommodating the front end of the vertical portion of the arm section 5.

The holding sections 6 rotates horizontally relative to the vertical section of the arm sections 5.

Here, neither of the holding sections 6 necessary are necessary components alternatively, the holding sections 6 have only to be rotatable relative to the vertical portion of at least one of the arm sections.

To the lower end portion of each of the vertical portion of the arm sections 5 and the holding sections 6, there is provided a stopper 9, so that the range in which the holding sections 6 can rotate can be limited by abutting these stoppers 9 against each other.

FIG. 4 illustrates how the handcart 1 with the above-described features moves when subjected to a direction change. Here, a movement when the direction of the handcart 1 is changed in the left direction is shown.

The positions of both holding sections 6 before the handcart 1 is subject to a direction change, are shown by a $C_2$-$C_2$ line. By pushing out the right-side holding section 6 from the position on the $C_2$-$C_2$ line, both holding sections 6 are moved up to the positions on a $D_2$-$D_2$ line. In response to this movement of the holding sections 6, both tire/wheel assemblies 3 move from the positions on an $A_2$-$A_2$ line to the positions on a $B_2$-$B_2$ line relative to the left-side tire/wheel assembly 3. As a result, the handcart 1 changes its direction by a degree of $\theta_2$ from the direction of a III-III line to that of a IV-IV line.

Figure 8:
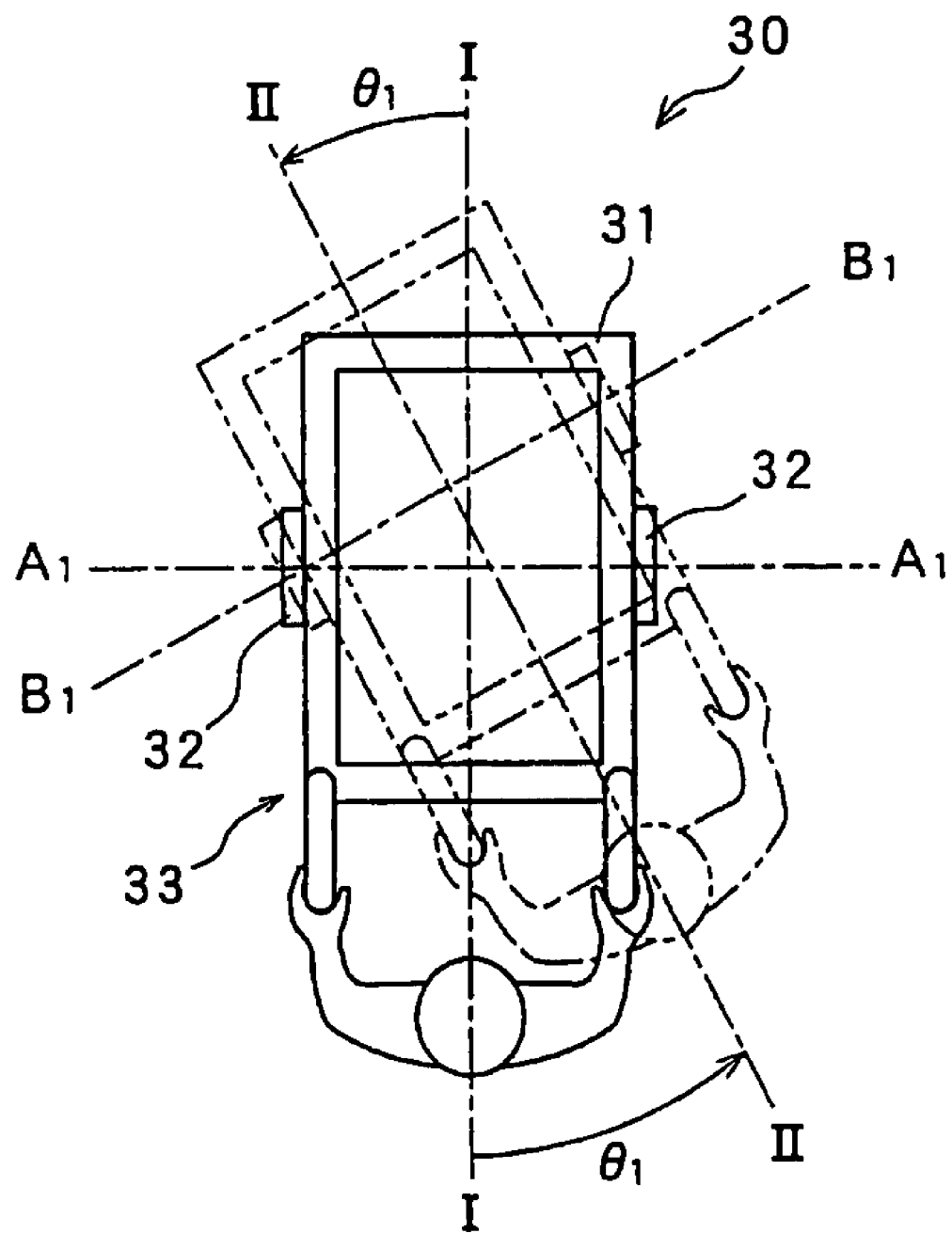
FIG. 8 is a schematic plan view showing a movement of a conventional handcart when subjected to a direction change.

Therefore, unlike the case of the conventional handcart 30 shown in FIG. 8, the handcart 1 can have its direction changed only by making a pushing-forward motion or a pulling-back motion with respect to the holding section 6, without the user having to move his or her body in keeping with the movement of direction change of the handcart 1.

In order to change the direction of the handcart 1 to the direction opposite to the foregoing case, i.e., to the right direction, it suffices only to make a pushing-forward motion or a pulling-back motion with respect to the holding section 6 located on the opposite side of the above-described case, in which the handcart 1 is has its direction changed to the left side.

As described above, since the handcart 1 can have its direction changed by making a pushing-forward motion or a pulling-back motion with respect to the holding section 6, there is no need for the user to move his or her body when making a direction change, thereby allowing the reduction in space necessary for making the direction change. This enables the handcart 1 to have its direction easily changed even in a confined space such as a narrow passage, thus resulting in saved labor.

Figure 5:
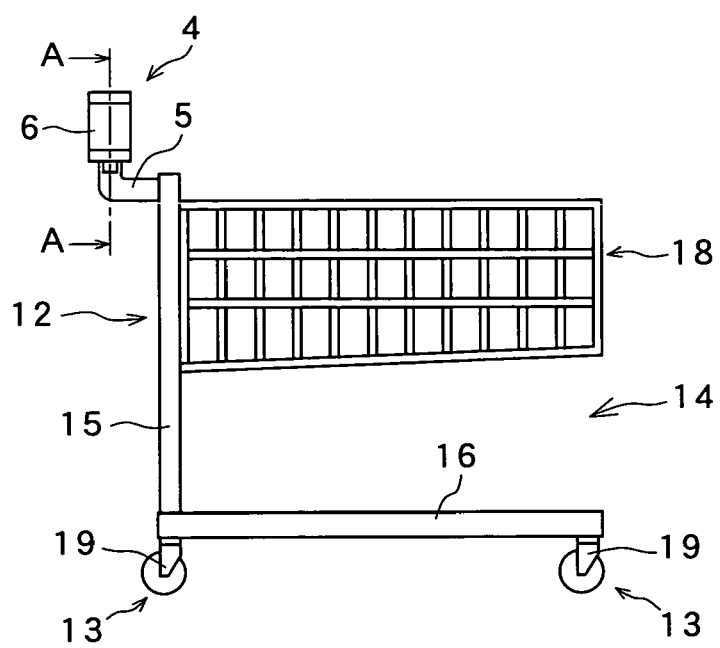
FIG. 5 is a schematic side elevation of a shopping cart according to a second embodiment of the present invention.
Figure 6:
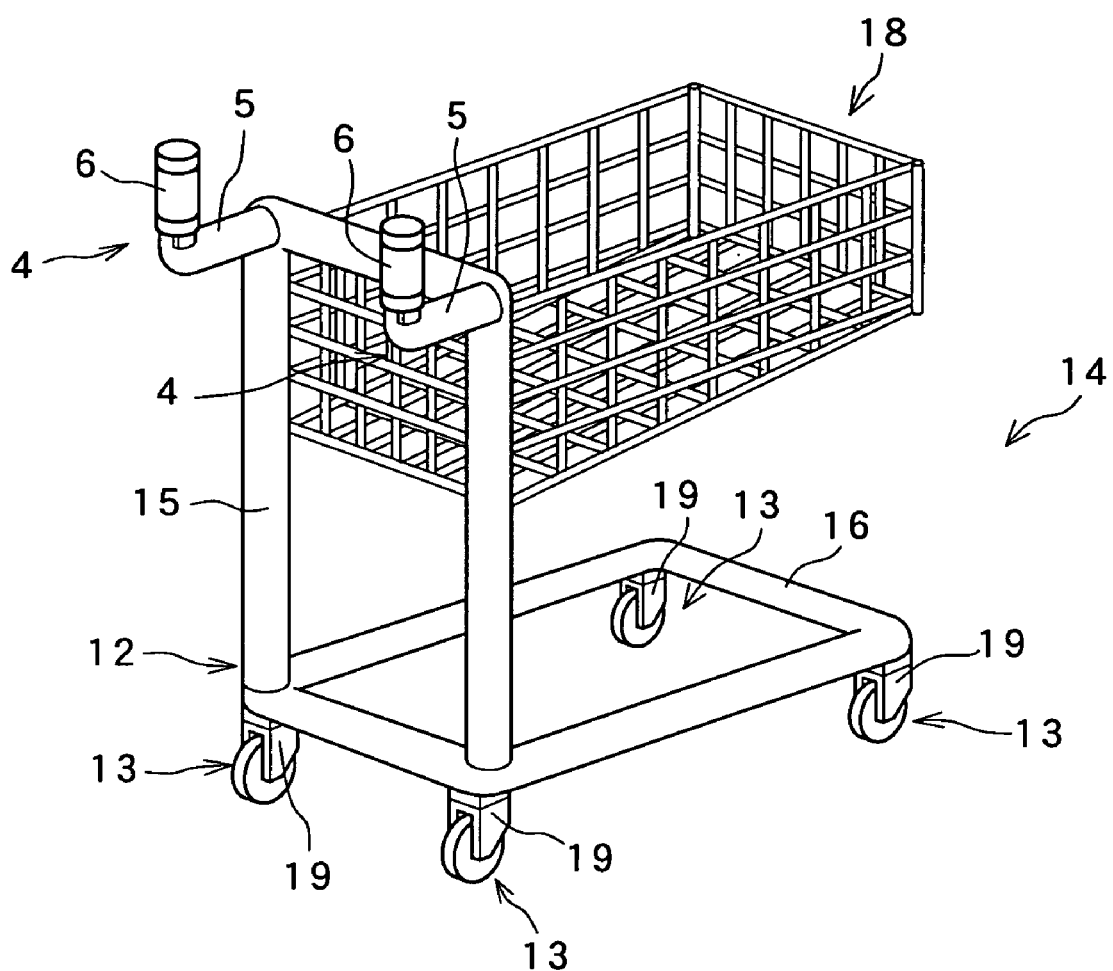
FIG. 6 is a schematic perspective view showing the overall construction of the shopping cart in FIG. 5.
Figure 7:
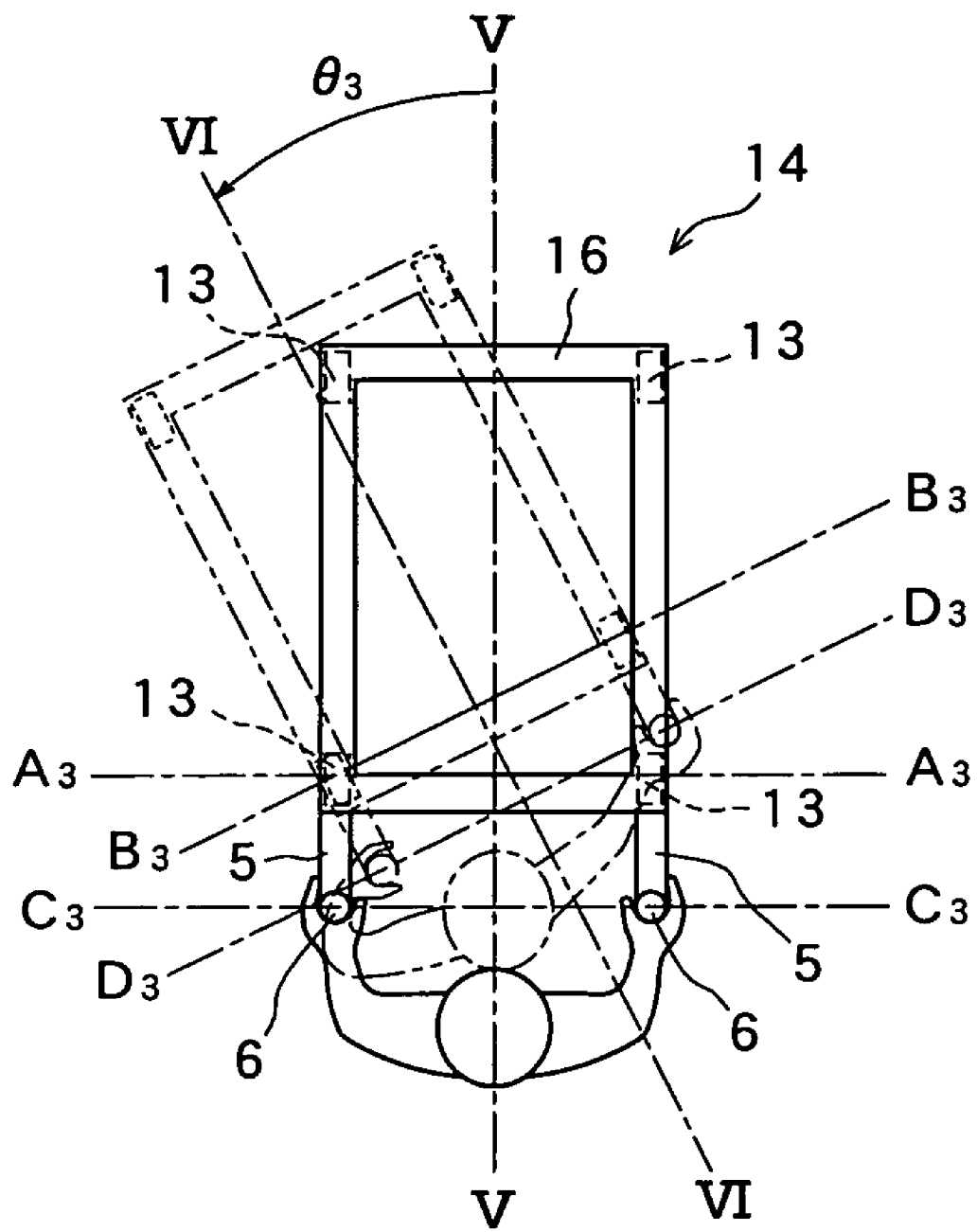
FIG. 7 is a schematic plan view showing a movement of the shopping cart when subjected to a direction change.

FIGS. 5 to 7 show a handcart according to a second embodiment of the present invention, wherein a shopping cart is adopted as a handcart.

Specifically, FIG. 5 is a schematic side elevation of this shopping cart; FIG. 6 is a schematic perspective view thereof; and FIG. 7 is a plan view showing how the shopping cart moves when subjected to a direction change.

As shown in FIGS. 5 and 6, the shopping cart 14 includes a main body section 12; wheels 13 provided at lower end portions at the front and rear of the main body section 12; and operation sections 4 provided at the rear of the main body section 2, and used for performing an operation for a movement in the traveling direction or an operation for changing the direction of the handcart.

The main body section 12 includes a main body frame 15 formed, for example, into an inverted U-shape by bending a pipe; and a carriage frame 16 installed to the lower end portions of the main body frame 15, and formed, for example, into a rectangular frame shape using a pipe.

At the front of the main body frame 15, a cage for carrying therein luggage and the like is integrally assembled with the main body section 12 by welding.

The wheels 13 are mounted to the lower ends at the front and rear of the carriage frame 16 in the main body section 12 by fittings 19. Thus, the shopping cart 14 according to this embodiment constitutes a four-wheel handcart.

From the viewpoint of direction change, it is desirable that the wheels 13 are configured so that, out of the four wheels provided at the front and rear, at least a pair of wheels 13 at the front can rotate by 360 degrees in the horizontal direction.

The operation sections 4 each have the same structure as that of the handcart 1 according to the first embodiment shown in FIG. 3, and hence they are omitted from description.

FIG. 7 illustrates how the shopping cart 14 moves when subjected to a direction change. Here, a movement when the shopping cart 14 has its direction changed in the left direction is shown.

The positions of both holding sections 6 before the shopping cart 14 is subject to a direction change, are shown by a $C_3$-$C_3$ line. By pushing out the right-side holding section 6 from the position on the $C_3$-$C_3$ line, both holding section 6 are moved up to the positions on a $D_3$-$D_3$ line. In response to this movement of the holding sections 6, both wheels 13 at the rear move from the positions on an $A_3$-$A_3$ line to the positions on a $B_3$-$B_3$ line relative to the wheel 13 provided on the left side at the rear of the carriage frame 16, so that the shopping cart 14 changes its direction by a degree of $\theta_3$ from the direction of a V-V line to that of a VI-VI line.

Therefore, the shopping cart 14 can have its direction changed only by making a pushing-forward motion or a pulling-back motion with respect to the holding section 6, as in the case of the first embodiment.

On the other hand, changing the direction of the shopping cart 14 to the right direction can be achieved by pushing forward the holding section 6 located on the opposite side of the above-described case, in which the shopping cart 14 has its direction changed to the left side.

Thus, since the shopping cart 14 can have its direction changed by making a pushing-forward motion or a pulling-back motion with respect to the holding section 6, there is no need for the user to move his or her body when making a direction change, thereby allowing the reduction in space necessary for making a direction change. Also, since the shopping cart 14 enables the user to easily change, directions it can save the user labor when subjected to the direction change.

In the shopping cart 14, the position of the wheel 13 that constitutes the center of a direction change, is located further near to the operation section 4 than in the two-wheel handcart 1 according to the first embodiment. This allows the shopping cart 14 to be have its direction changed at a position further toward the user than in the handcart 1, thereby enabling a direction change in an even more confined space.

The above-described operations can be implemented also by configuring the present invention so that the user directly holds the vertical portions of the arm sections 5, without providing the operation sections 4 with the holding sections 6.

What is claimed is:

1. A handcart movable by pushing in the traveling direction thereof, the handcart comprising:
    a main body section;
    at least a pair of wheels provided to the main body section; and
    operation sections provided at the rear in the traveling direction of the main body section,
    wherein the operation sections are installed on the right and left sides of the main body section, and each of the operation sections is formed of an L-shaped member having an arm section with a distal end thereof protruding from the rear in the traveling direction of the main body section and having a vertical portion extending from the distal end of the arm section;
    wherein each of the operation sections is configured so that a holding section is fitted onto the outside of the vertical portion of the arm section thereof so as to be freely rotatable within a predetermined range relative to the vertical portion;
    wherein a lower end portion of each vertical portion has a stopper portion protruding radially therefrom and a lower end of each holding section has a stopper portion protruding distally therefrom for respective selective contact with the vertical portion stopper portion to limit the predetermined range in which the holding sections can freely rotate.

2. The handcart according to claim 1, wherein the main body section has a box-shaped luggage carrier with the top surface thereof being open.

3. The handcart according to claim 1, wherein the main body section has a cage with the top surface thereof being open.

4. A handcart movable by pushing in the traveling direction thereof, the handcart comprising:
    a box-shaped main body section with the top surface thereof being open;
    a pair of wheels provided on the right and left sides of the main body section; and
    operation sections provided at the rear in the traveling direction of the main body,
    wherein the operation sections are installed on the right and left sides of the main body section;
    each of the operation sections is formed of an L-shaped member having an arm section with a distal end thereof protruding from the rear in the traveling direction of the main body section and having a vertical portion extending from the distal end of the arm section; and
    a holding section is fitted onto the outside of the vertical portion of the arm section thereof so as to be freely rotatable within a predetermined range relative to the vertical portion;
    wherein a lower end portion of each vertical portion has a stopper portion protruding radially therefrom and a lower end of each holding section has a stopper portion protruding distally therefrom for respective selective contact with the vertical portion stopper portion to limit the predetermined range in which the holding sections can freely rotate.

5. A handcart movable by pushing in the traveling direction thereof, the handcart comprising:
    a cage-shaped main body section with the top surface thereof being open;
    a pair of wheels provided on the right and left sides at each of the front and rear of the main body section; and
    operation sections provided at the rear in the traveling direction of the main body,
    wherein the operation sections are installed on the right and left sides of the main body section;
    each of the operation sections is formed of an L-shaped member having an arm section with a distal end thereof protruding from the rear in the traveling direction of the main body section and having a vertical portion extending from the distal end of the arm section; and a holding section is fitted onto the outside of the vertical portion of the arm section thereof so as to be freely rotatable within a predetermined range relative to the vertical portion;

wherein a lower end portion of each vertical portion has a stopper portion protruding radially therefrom and a lower end of each holding section has a stopper portion protruding distally therefrom for respective selective contact with the vertical portion stopper portion to limit the predetermined range in which the holding sections can freely rotate.

6. The handcart according to claim 5, wherein the wheels are configured so that a pair of wheels provided at least at the front of the main body section, out of the front and rear thereof, are rotatable in the horizontal direction.

* * * * *